United States Patent
Malvestuto, Jr.

(10) Patent No.: US 6,732,972 B2
(45) Date of Patent: May 11, 2004

(54) HIGH-LIFT, LOW-DRAG, STALL-RESISTANT AIRFOIL

(76) Inventor: Frank S. Malvestuto, Jr., 5059 Milton St., San Diego, CA (US) 92110

( * ) Notice: Subject to any disclaimer, the term of this patent is extended or adjusted under 35 U.S.C. 154(b) by 0 days.

(21) Appl. No.: 10/370,740

(22) Filed: Feb. 21, 2003

(65) Prior Publication Data
US 2004/0065772 A1 Apr. 8, 2004

Related U.S. Application Data

(60) Provisional application No. 60/410,709, filed on Sep. 13, 2002.

(51) Int. Cl.[7] .............................................. B64C 23/00
(52) U.S. Cl. ........................ 244/12.3; 244/23 B; 244/55; 244/56
(58) Field of Search ............................. 244/12.1, 12.3, 244/12.4, 12.5, 23 B, 23 D, 207, 204, 205, 55, 56, 66, 65, 6, 7 R

(56) References Cited

U.S. PATENT DOCUMENTS

| | | | |
|---|---|---|---|
| 1,307,826 A | * | 6/1919 | Matthews et al. ............. 244/6 |
| 2,415,710 A | * | 2/1947 | Smith ........................ 244/56 |
| 3,023,709 A | * | 3/1962 | Kondo .................... 416/223 R |
| 3,179,354 A | * | 4/1965 | Alverez-calderon ......... 244/56 |
| 3,273,827 A | * | 9/1966 | Girard ......................... 244/55 |
| 3,372,891 A | | 3/1968 | Malvestuto, Jr. |
| 3,856,238 A | | 12/1974 | Malvestuto, Jr. |
| 3,965,836 A | | 6/1976 | Malvestuto, Jr. |
| 4,506,849 A | | 3/1985 | Lemont |
| 4,585,391 A | | 4/1986 | Vuillet et al. |
| 4,655,419 A | | 4/1987 | van der Hoeven |
| 5,016,837 A | | 5/1991 | Willis |
| 5,195,702 A | * | 3/1993 | Malvestuto, Jr. ............ 244/215 |
| 5,244,167 A | | 9/1993 | Turk et al. |
| 5,251,847 A | | 10/1993 | Guimbal |
| 5,503,351 A | | 4/1996 | Vass |
| 5,634,613 A | | 6/1997 | McCarthy |
| 5,873,545 A | | 2/1999 | Kapin et al. |
| D418,805 S | | 1/2000 | Cycon et al. |
| 6,014,940 A | | 1/2000 | Jacobson |
| 6,053,451 A | | 4/2000 | Yu |
| 6,086,016 A | | 7/2000 | Meek |
| 6,270,038 B1 | | 8/2001 | Cycon et al. |
| 6,343,768 B1 | | 2/2002 | Muldoon |
| 6,450,446 B1 | | 9/2002 | Holben |
| 6,457,670 B1 | | 10/2002 | Geranio et al. |

* cited by examiner

Primary Examiner—Galen L. Barefoot
(74) Attorney, Agent, or Firm—Michael Blaine Brooks, P.C.; Michael Blaine Brooks

(57) ABSTRACT

Method and apparatuse embodiments of the present invention are diclosed wherein wing-rotor configurations provide aerodynamically high lift-low drag capabilities and improvements over the prior art including increasing effective stall angles. In addition, wing-rotor-propeller configurations provide aerodynamically high lift-low drag and forward thrust capabilities and improvements over the prior art for all vehicles moving through gaseous fluids and particular including application for air vehicles and watercraft. Also, wing leading edge air blowing systems augment the example configurations for enhanced performance including substantially vertical take-off and landing of air vehicles.

68 Claims, 12 Drawing Sheets

HIGH-LIFT, LOW-DRAG, STALL-RESISTANT AIRFOIL

CROSS REFERENCE TO RELATED APPLICATIONS

This application claims the benefit of U.S. Provisional Patent Application Ser. No. 60/410,709 of Frank S. Malvestuto entitled, "MEANS AND METHODS FOR ACHIEVING SIGNIFICANT INCREASES IN AERODYNAMIC LIFT AND REDUCTIONS IN AERODYNAMIC DRAG FOR WINGS OPERATING AT SUBSONIC SPEEDS," filed Sep. 13, 2002, the disclosure of which, including all appendices and all attached documents, is hereby incorporated herein by reference in its entirety for all purposes.

BACKGROUND

The invention relates to lifting surfaces, such as wings, operating at subsonic speeds and more specifically, to lifting surfaces influenced by the flow of air from vortices located in close proximity to the trailing edges of the lifting surfaces.

An idealized airfoil, such as a flat plate of infinite span and a thickness approaching zero, when moving through a gaseous fluid, e.g., air, at a fixed velocity, and the surface of the airfoil is at a small angle, i.e., the angle-of-attack, relative to the direction of motion, the oncoming flow is separated into a flow of air along the upper surface of the airfoil and a flow of air along the lower surface. This bifurcation of the flow starts in the vicinity of the leading edge of the airfoil, and becomes confluent at the trailing edge of the airfoil. This Kutta Joukowsky hypothesis is acceptably accurate for the ideal airfoil, provided the angle-of-attack of the airfoil approaches zero. For much larger angles-of-attack, the velocity of the airflow over the upper surface of the airfoil is considerably reduced as the flow of air approaches the trailing edge. The air, therefore, separates from the wing simply because the reduced momentum of the air flow prohibits the flow of air to continue to the trailing edge of the wing and beyond. This flow separation results in loss of wing lift and can cause an aircraft flight safety problems. Severe causes of wing air flow separation is commonly termed "wing stalling". Practical airfoils, or wings, do not have infinite spans. Airfoils of finite wingspan, therefore, when moving through the air at a finite speed and inclined to the direction of motion, i.e., having a positive angle-of-attack, will be pushing down on the incoming air. The reaction of the affected air is to impose an air pressure on the lower surface of the airfoil and in close proximity to the wingtips to accelerate air upward and around the wingtip edges of the finite span wing. The air moved upwards in the vicinity of the wing tips, as the wing moves forward, forms a rolled-up vortex flow whose axis of formation is nearly parallel to the direction of flight. Because wingtip vortices are known to increase the drag of an airfoil and with it, a reduction in its aerodynamic efficiency, the reduction of wingtip vortices is a subject of continued practical interest. Airfoils moving in a rotational manner are also known to produce vortex flows off the edges of their distal wingtip, or blade tip. Due to the reduction in efficiency produced by blade tip vortices, airfoil shapes, particularly their planforms, are varied in efforts to minimize vortex production. Two or more airfoils rotating about a hub or axis of rotation can be termed a rotor or a propeller with the word propeller applied principally to the rotating propulsor providing forward thrust.

Lifting structures can include the combination of a translational airfoil, a wing, and one or more rotors in close proximity to the trailing edge of the wing. Rotors in close proximity to a wing provide lift augmentation to the wing, drag reduction and stall resistance. If mounted and articulated, they may provide flap augmentation.

Rotors surrounded or partially surrounded by the surfaces of a wing are known to interact via the vortex flow of their blades with the airflow of the wing. An example of this aerodynamic interaction is the augmentation of the lift of the wing of an aircraft by the interactions of the wing flow with flow of a rotor located in a semi-circular cutout in the rear portion of the wing with the center of rotation of each rotor located on what would otherwise be the trailing edge of the wing.

While the above art provides for enhanced lift and reduction in drag to airfoils, there remains a need for significant basic improvements in the aerodynamic performance of wing-rotor systems, including wing stalling. New technical design architectures for vehicular embodiments and operation are required, including the synergistic combination of a wing, rotor and propeller for increased lift, reduced drag and increased thrust requirements. In particular, when compared to semi-circular cutouts, there is a significant fundamental need to increase the wing area ahead of the cutout so that a larger portion of the wing area from the wing's leading edge to cutout contour, is more favorably influenced by rotor flow. Accordingly, there is a need to move the axis of rotor rotation aft of the wing's original trailing edge thereby increasing the surface area of the wing ahead of the frontal section of the cutout contour. Further and most significantly, moving the axis of rotation aft of the wing's trailing edge also minimizes and possibly eliminates any potential adverse effects of rotor inflow on induced wing lift and stall resistance from that portion of the rotor inflow that is located behind the axis of rotation of the rotor.

Each blade of a propeller produces a vortex flow that generally is not considered by those skilled in the art as a contributor to induced lift or induced thrust. There are geometric techniques, as stated herein, for propellers located in close proximity to wing surfaces that permit propeller blade tip vortices to augment wing lift and provide induced thrust.

SUMMARY

Disclosed are the methods and means for enhancing lift, reducing drag, and enhancing the pre-stall angle-of-attack of an airfoil illustrated by several apparatus embodiments of the present invention wherein wing-rotor configurations are described that provide aerodynamically enhanced high lift, low drag, and a resistance to stall. Also described is a wing leading edge air blowing system in conjunction with a trailing edge wing-rotor combination providing means for substantially vertical take-off and landing of air vehicles and substantially precluding the air vehicle from stalling. In addition, wing-rotor-propeller embodiments are described that provide aerodynamically high lift and low drag and forward thrust for all vehicles including embodiments for air vehicles and watercraft.

The teachings of the present invention illustrate, through example embodiments, the benefits of vortex interaction maximization via less-than-semicircular airfoil cut-outs (i.e., arcular or arcuate airfoil trailing edge recesses) while enhancing the vortex amplitude via rotor blade planform design. Additionally, the present invention through example embodiments, illustrates the benefits of vortex interaction maximization using a propeller interposed between two substantially parallel airfoils with at least one airfoil having a plurality of rotors each rotating within a cut-out or recess. Additionally, the present invention, through example embodiments, illustrates the benefits of augmenting wing-rotor assemblies with air blowing devices and thereby enhance the lift augmenting of the wing-rotor assembly.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION

Figure 1A:
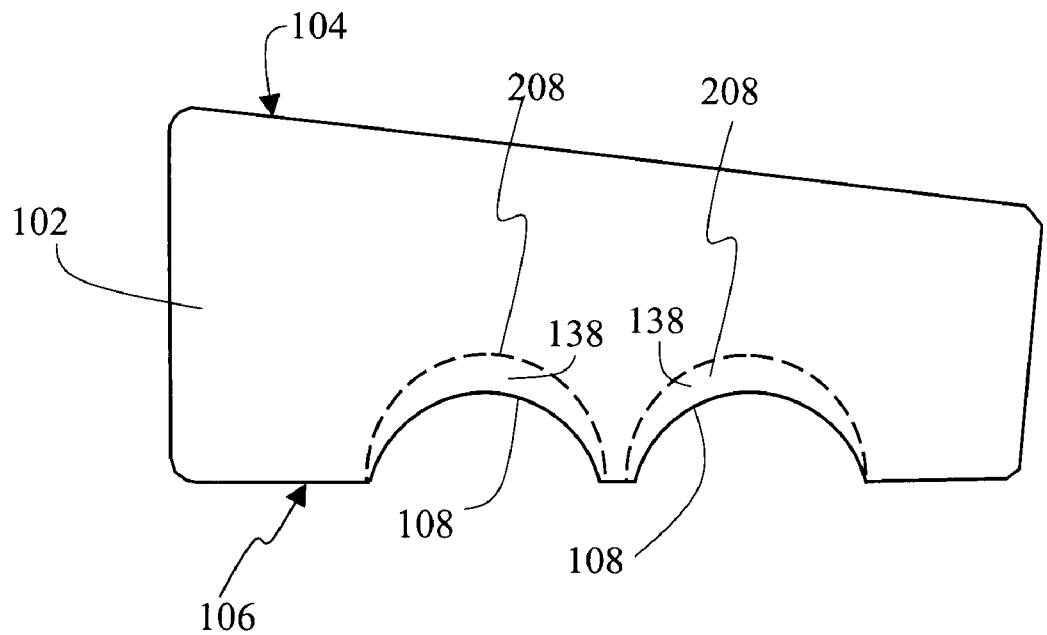
FIG. 1A is a plan view of a wing illustrating semi-circular and arcular cutout regions.
Figure 1B:
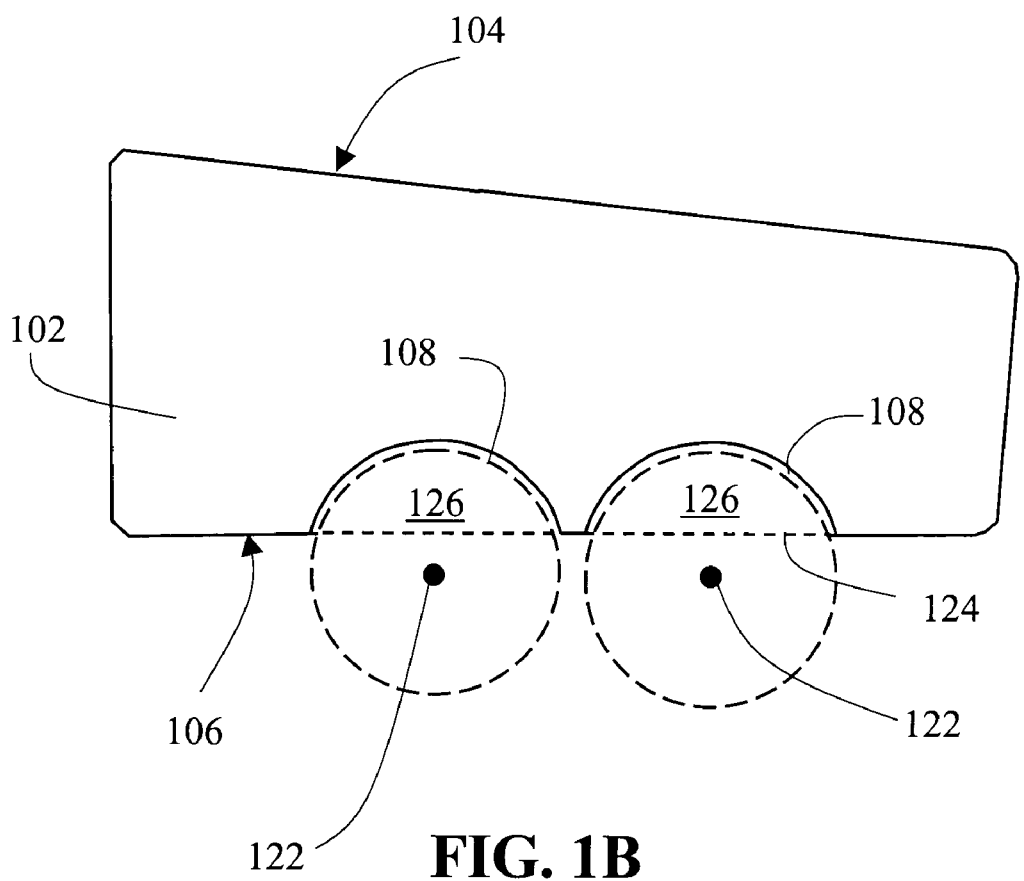
FIG. 1B is a plan view of an example wing having two arcular cutouts of the present invention.
Figure 1C:
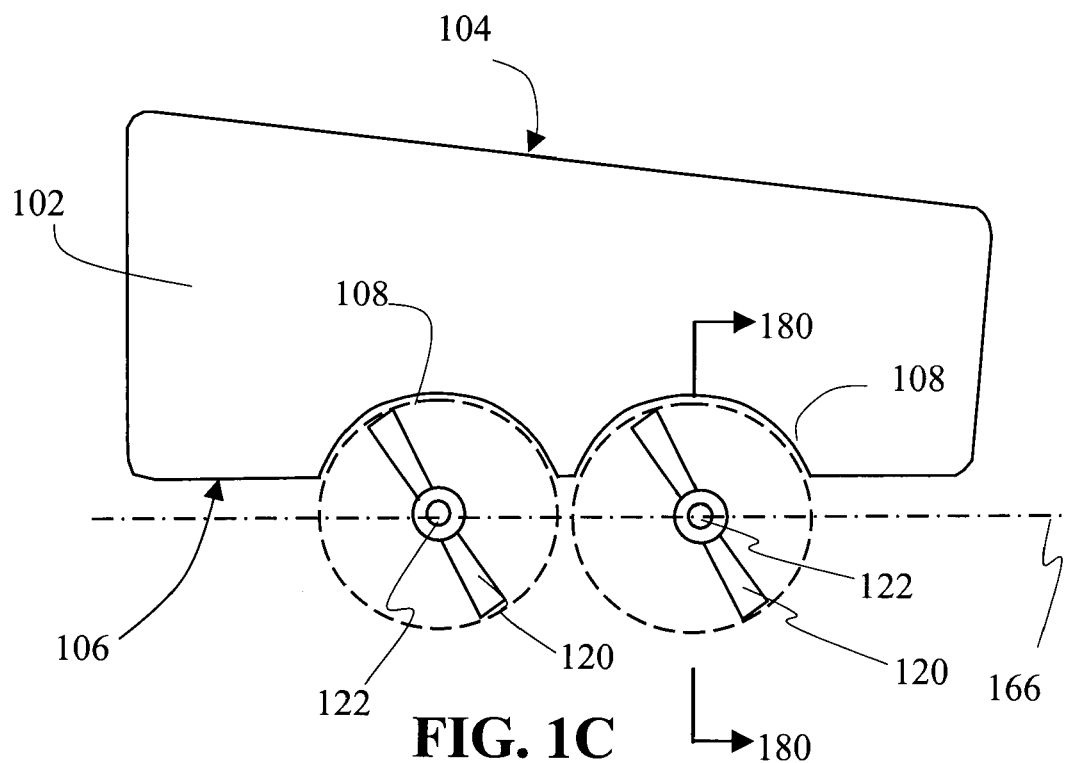
FIG. 1C is a plan view of a wing illustrating two rotors, each with their center of rotation aft of the wing's trailing edge and having a portion of the rotor region of rotor rotation coincident with an arcular cutout region.
Figure 1D:
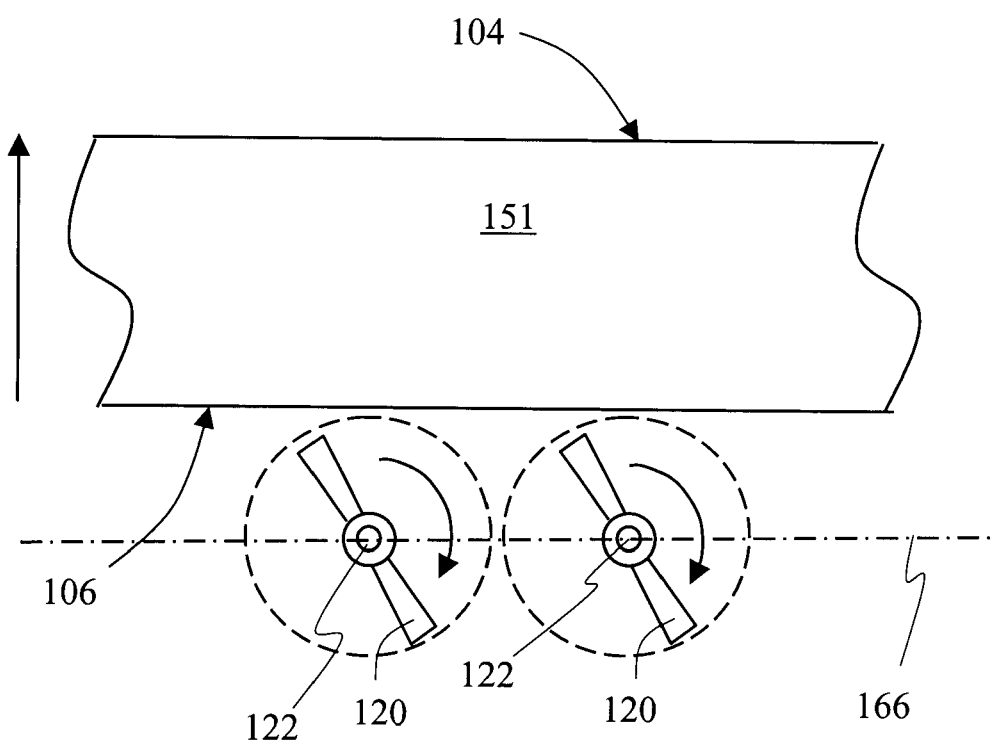
FIG. 1D is a plan view of a wing illustrating two rotors, each with their respective center of rotation and entire region of rotation aft of the wing's trailing edge.

FIG. 1A is a plan view of a wing 102 illustrating that, for a given rotor diameter, arcular cutouts 108, as contrasted with semi-circular cutouts 208, result in more wing area 138 ahead of the cutout, or wing recess, that is favorably influenced by rotor flow. Additionally, any potential adverse effects of "rotor inflow" on wing lift and stall resistance from that portion of the rotor flow behind its axis of rotation is significantly reduced or eliminated by the axis of rotation 122 of the several embodiments of the present invention being aft of the original wing trailing edge 106. FIG. 1B is a plan view of a wing 102 having a leading edge 104 and a trailing edge 106 with arcuate or "arcular" cutouts 108 where the term "arcular" is used to describe arcs of circles the centers of rotation 122 of which are behind the imaginary lines of extension 124 of trailing edges 106 of the wing 102 and by necessity require less cutout area than semicircular cutouts. That is, the arcular area of a wing in plan view is substantially equivalent to a segment of a circle with the chord being analogous to the trailing edge. Accordingly, a portion of the rotor travel 126 is within the region of the arcular cutout or arcuate recess 108. Rotors 120 whose axes of rotation 122 are behind and in line 166 substantially equidistant from or otherwise substantially parallel with the original trailing edge of the wing 106 and substantially coincident with the axis for the arcular cutouts 108 are illustrated in FIG. 1C. An alternative wing planform 151 illustrated by FIG. 1D has rotors 220 whose axes of rotation 122 are behind the trailing edge of the wing 106 to the extent that no portion of the sweep of each rotor crosses the trailing edge of the wing 151.

Figure 2A:
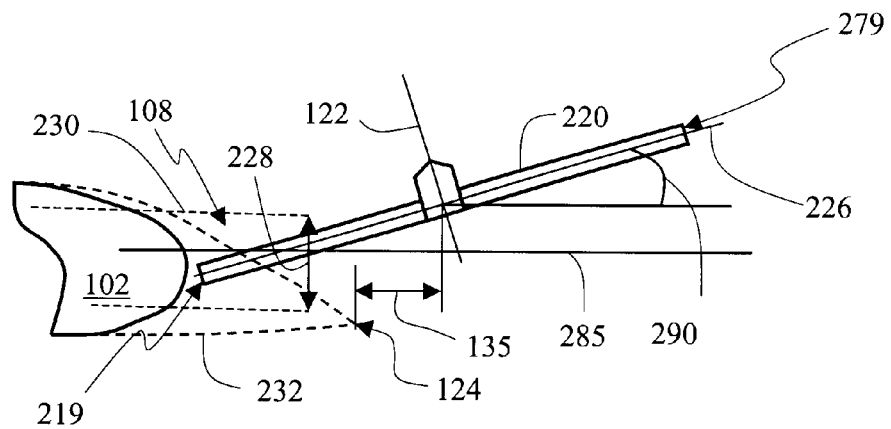
FIG. 2A is a side view of an example rotor orientation of the present-invention.
Figure 2B:
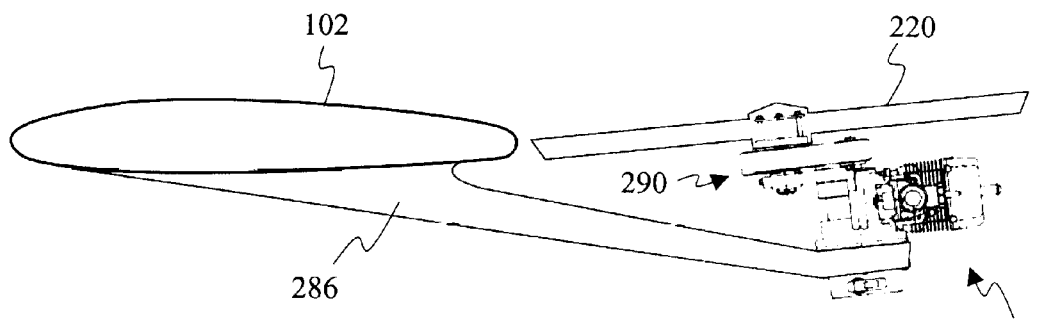
FIG. 2B is a side view of an example rotor motor assembly of the present invention.

FIG. 2A is a side view at a cross-section 180 of FIG. 1C illustrating a preferred embodiment of the present invention including: each rotor 120 installed in a plane inclined relative to each of the cutouts 108; the center of rotation 122 of each rotor located aft 135 of the nominal trailing edge extension line 124 of the wing 102; the height of vertical boundary 228 of each cutout 108 of sufficient size to permit tips of the blades 219 of rotors 120 to be below the upper boundary 230 of the cutout 108 and above lower boundary 232 of the cutout 108; and where the leading tips of blades 219 of the rotors 120 are in close proximity to the boundary of cutout 108 and the trailing tips of the blades 279 may be in or out of the plane of the wing 285. The rotor in this example is inclined at an angle 290. This angle of inclination 290, measured from the plane of the wing 285 in this example to the plane of rotor rotation 226, is variable and in alternative embodiments subject to servo-based adjustment as part of an example mounting assembly illustrated in FIG. 2B. FIG. 2B illustrates in example the propulsion unit 288 is mounted to the wing 102 via a support unit 286 that is rigidly attached to the lower surface of the wing 102. The rotor 120 is attached to the shaft 290 of the propulsion unit 288. Embodiments of the propulsion unit 288 include a gasoline engine, an electric motor and a hydraulic motor. For each of these example embodiments, the propulsion unit 288 is rigidly attached to the wing by the support unit 286. In several embodiments, the rotor angle of inclination 290 is fixed and part of a rigid mounting assembly 286, as illustrated in FIG. 2B. This mounting configuration for rotors 120 as well as propellers is well understood from the prior art. In several embodiments of the present invention, the rotor angle of inclination 290 is adjustable so that the plane of the blades 226 is inclinable to the plane of the wing 285 or to an angle out of the plane of the wing. For all flight conditions of practical use and for all adjustments in inclination 290 whether fixed, manually adjusted or adjusted as part of a servo system and for each rotor, the leading tips of the rotor blades 219 are continually below the upper edge of each arcular cutout 108 and above the lower edge of each cutout 232. In alternative embodiments where the craft is propelled principally with propellers, mechanical drive linkages are made to drive the rotors 120 parasitically off the propeller motor and accordingly, separate propulsion units are not used. In alternative embodiments the rotors have variable pitch where the local angle-of-attack of each blade is adjustable. In addition, the drive shafts may be disengaged in the event of drive power failure, allowing the rotors to be feathered.

Figure 3A:
FIG. 3A illustrates a rotor planform with an inverse taper.
Figure 3B:
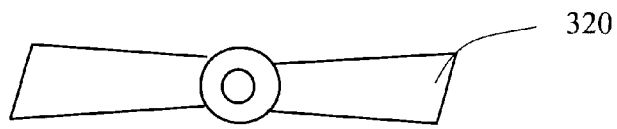
FIG. 3B illustrates a rotor planform with an inverse taper and swept tips

The preferred planform shapes of rotors are illustrated in FIGS. 3A and 3B. The preferred planform taper ratio is inverse; that is, the length of the chord at the tip of a blade is greater than the chord lengths at distances from the axis of rotation less than the tip chord distance. The planform shapes of inverse taper ratio are preferred due to their vortex creation properties. FIG. 3A illustrates a rotor 310 with linearly increasing chord length as the distance from the axis of rotation increases. FIG. 3B illustrates a rotor 320 with linearly increasing chord length as the distance from the axis of rotation increases combined with linearly swept tips at each end.

Rotor Tip Vortex

Figure 4:
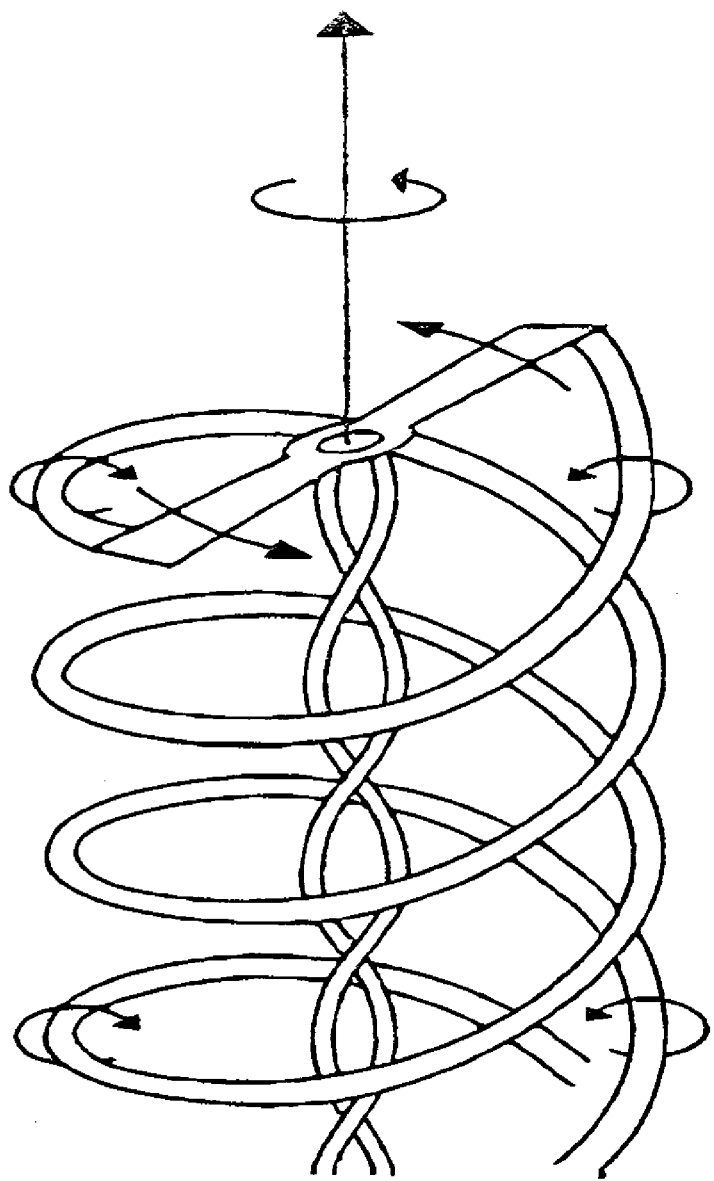
FIG. 4 is a perspective view illustrating the vortex flow emanating from the tips of a rotor or propeller in motion.
Figure 5:
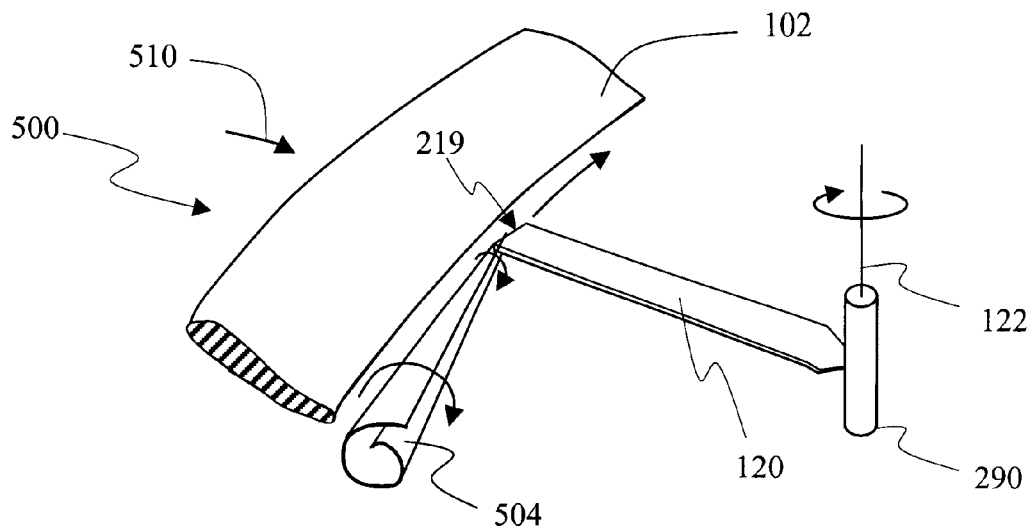
FIG. 5 is a perspective view of the rotor tip trailing vortex in proximity to the wing.

FIG. 4 is an illustration of a helical system of rotor vortex lines. FIG. 5 illustrates a sector of the rotor-wing configuration 500 operating at a forward speed $V_o$ 510. A major portion of the rotor shaft 290 horsepower is expended to overcome that part of the fluid resistance to the rotating blades 120 that is dependent upon blade lift. This energy, expended to the fluid, produces and maintains a vortex system that trails the rotating blades 504. In a simplified sense, the "tip" vortex 504 of the trailing vortex system, illustrated in FIG. 5, produces a significant increase to the circulatory flow around the wing 102. The increase in circulatory flow around the wing is to increase the aerodynamic efficiency of the wing, i.e., to increase lift, reduce drag, and increase stall resistance. The favorable contribution of the trailing vortex system of the rotor tip 504 is, by far, the largest contributor to the aerodynamic efficiency of the wing 102. Based upon this new aerodynamic discovery, the aerodynamic efficiency of the wing/rotor system is improved and that improvement in embodiments of the wing-rotor assemblies of the present invention is determinable to a great extent by a method of calculating the contribution of the vortex flow of the rotor to the aerodynamic characteristics of the wing, including stalling, and thereby permits the selection of the appropriate properties of arcular cutouts 108, and the inverse taper rotor blade planform 310, 320 for maximum aerodynamic efficiency.

Interface Vortex Wake

Figure 6:
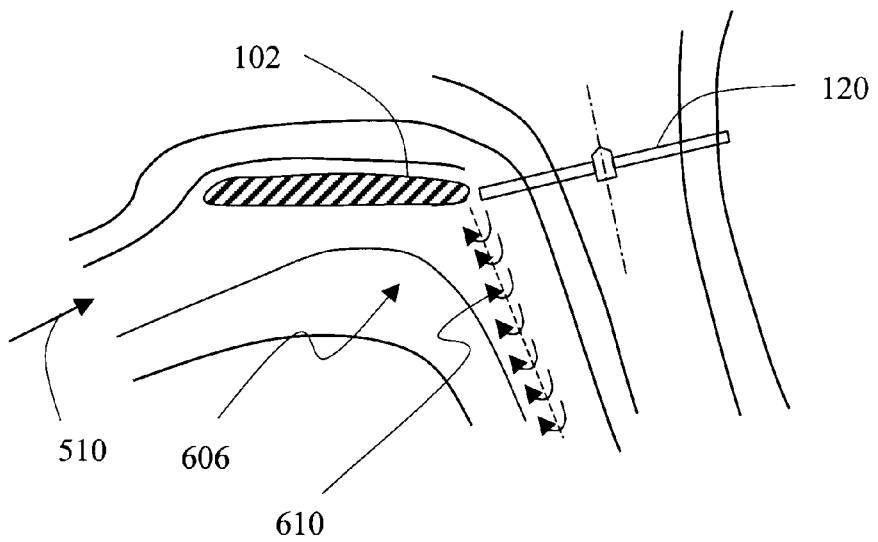
FIG. 6 is a side view of a wing and rotor illustrating the rotor interface vortex flow within the wing airflow.

FIG. 6 is an illustration of the interface vortex wake 610. This significant flow phenomenon of the wing-rotor combination that must be understood to be used as part of the method of configuring the wing-rotor embodiments, is the mechanism of the "interface" vortex wake that in a simplified sense represents a "free surface" fluid boundary between the flow along the lower surface of the wing 606 and the rotor wake flow 610.

To this point in the disclosure of the application of the principles by way of the embodiments of the presentation, the direction of vortex circulation is assumed to be consistent with that required for the rotor providing lifting thrust. The following is the disclosure of the effect of the "interface vortex wake" on the aerodynamics of the wing for the wing angle-of-attack assumed to be zero, i.e., practicably negligible.

Figure 7:
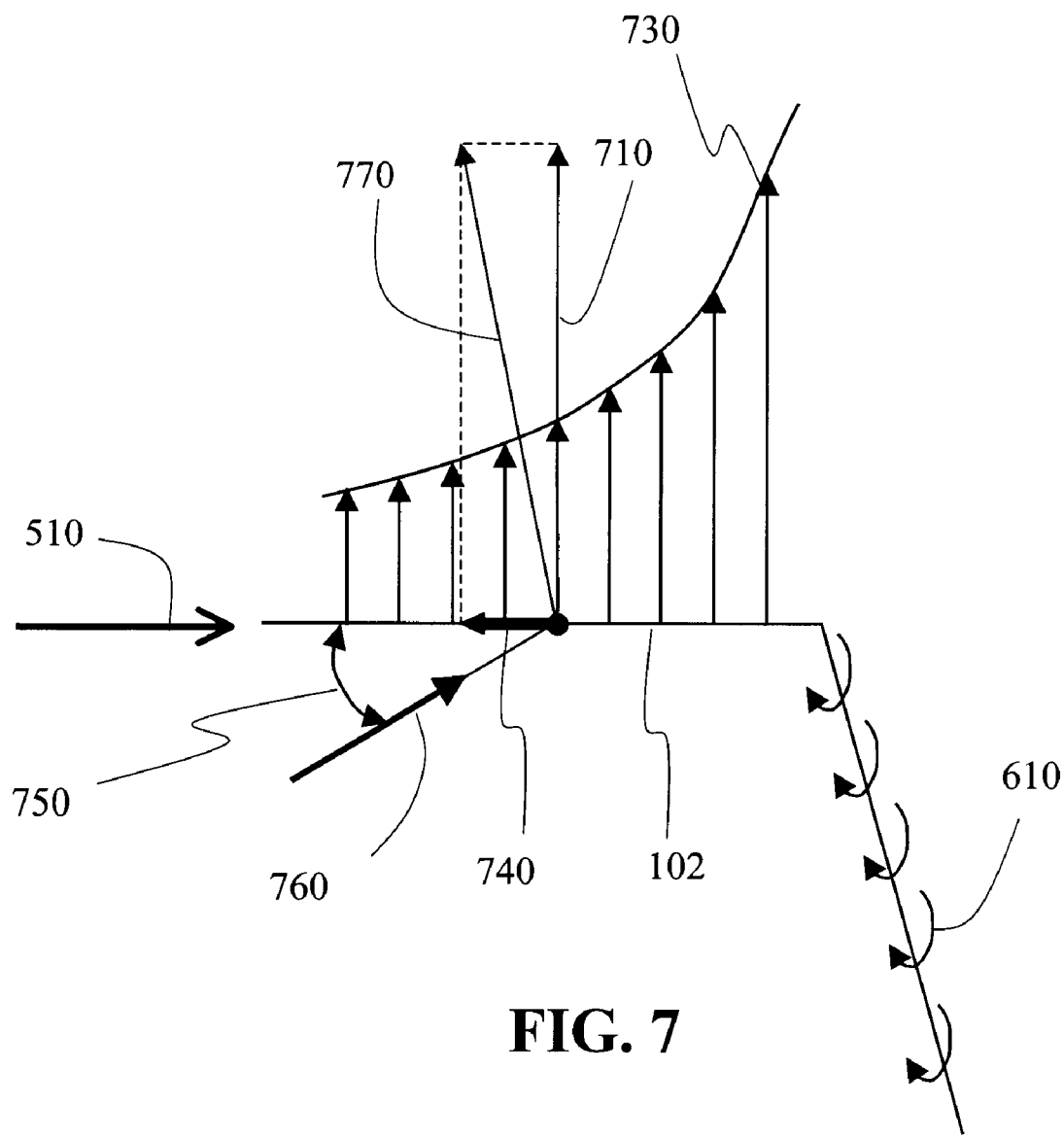
FIG. 7 is a diagram illustrating the upward velocity induced along the wing by the rotor vortices increasing in the direction of the trailing edge of the wing.

The vortices of the interface vortex wake 610 can be considered as identical mechanisms by which momentum can be transmitted in a fluid. In the several embodiments of the present invention, the "interface" vortices 610, by inducing upward directed velocities along the surface of the wing 102, impart fluid momentum to the wing. FIG. 7 illustrates in a diagram that this imparting of fluid momentum to the wing 102, per unit of time, results in a lift force 710 acting on the wing 102. Indications of the magnitudes of the induced lifting pressure distribution and induced lift force are obtained from FIGS. 6 and 7, respectively. Now the fluid mass that imparts, or otherwise induces momentum to the wing 102 also induces kinetic energy to the wing. The kinetic energy induced on the wing 102 provides an induced aerodynamic thrust force 740 acting on the wing of a magnitude such that the product of this force and the forward velocity of the wing. $V_o$, the rate of doing work, is equal to the magnitude of the kinetic energy induced on the wing per unit of time.

The aerodynamic forces induced on the wing 102 by the action of the "interface" vortices are enhanced by the conventional "vector" method. Referring to the diagram of FIG. 7, the "upwardly" directed velocities (i.e., up wash velocity) 730 induced along the wing by the action of the vortices 610 results in an effective local increase in wing angle-of-attack 750. Since the local resultant aerodynamic forces must be at right angles to the local stream velocity 760, the force vector must be rotated ahead of the lift vector by an amount necessary to be orthogonal to the local stream velocity 760. The component of this resultant vector 770 parallel to the stream direction must, therefore, be a "thrust" vector 740, and not generally a drag vector.

If one contrasts the aerodynamic forces induced on a wing by vortex action with the aerodynamic forces "imposed" on an isolated wing by a fluid reaction, i.e., wing at angle-of-attack, in the latter case a drag force occurs, plus the tendency for flow separation along the upper surface that leads to stalling instead of a favorable thrust force that exists for the wing-rotor configuration combined with flow attachment along the upper surface even at high angles-of-attack. This aerodynamic anti-stall phenomenon, is a new and significant discovery, due principally to the rotor vortex flow, and in particular the tip flow.

Air Blowing System

Figure 8A:
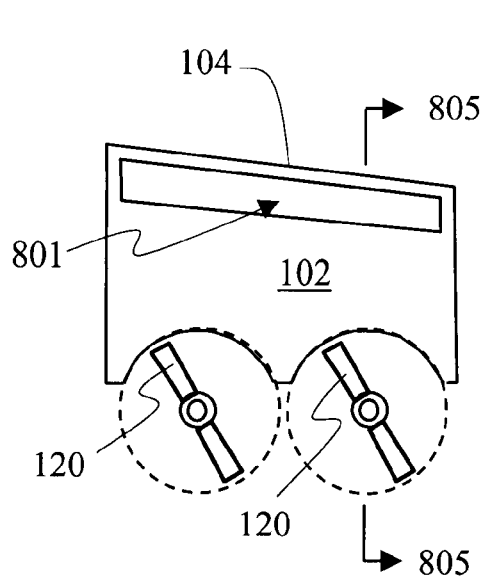
FIG. 8A is a plan view of a wing with arcular cutouts and rotors combined with an air blowing system.
Figure 8B:
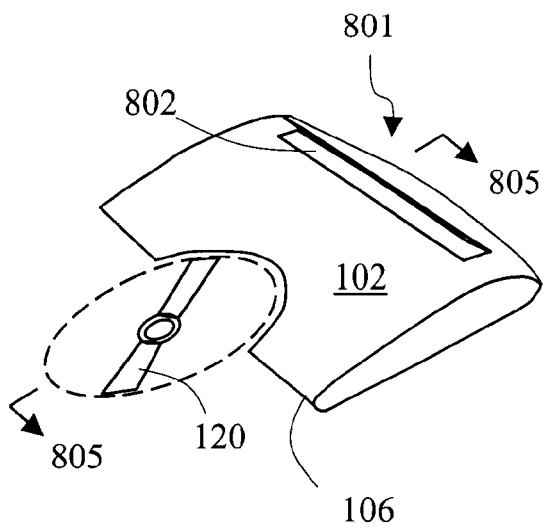
FIG. 8B is a perspective view of a wing with a singular arcular cutout and rotor combined with an air blowing system.
Figure 9:
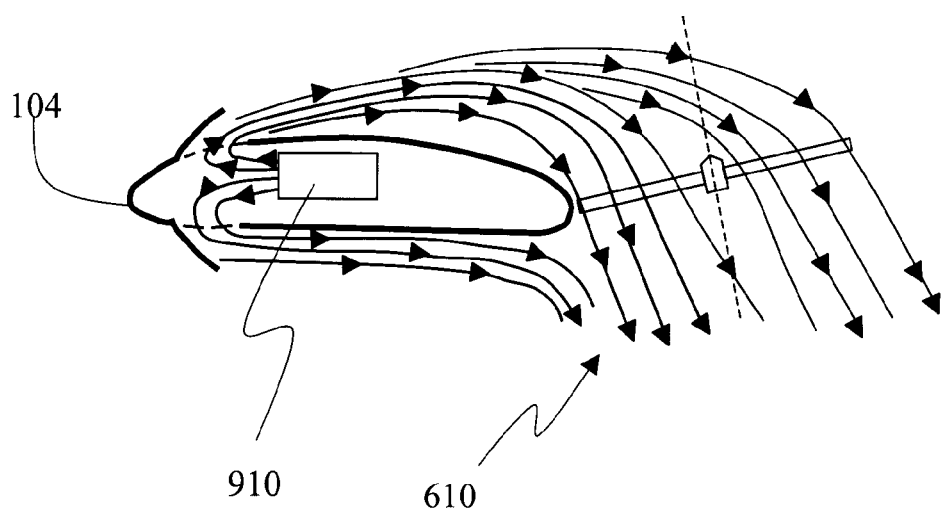
FIG. 9 is a cross-sectional view of wing and rotor flows initiated by compressed air blown over the wing surfaces.

FIG. 8A illustrates, in plan view, an air blowing system for a wing-rotor configuration with the jets 801 placed aft of the leading edge 104 of the wing 102. In some embodiments, the jets 802 are mounted conformal to the wing surface. FIG. 8B is a perspective view depiction of this air blowing system 801. The combination of this air blowing system 801 and the wing-rotor system permits substantially vertical take off and landing (VTOL). Mechanically generated air flows along the upper and lower surfaces of the wing 102 from leading edge 104 to trailing edge 106 is provided through leading edge slots 802. FIG. 9 is a cross- sectional view taken at 805 of FIGS. 8A and 8B illustrating the compressed air blowing embodiment having a blower 910 working to enhance the beneficial effects of the wing-rotor configuration. The increased airflow works to amplify the effects of the interface vortices 610 resulting in enhanced lift and forward thrust at airspeed with air blowing augmentation.

WING-ROTOR-PROPELLER CONFIGURATIONS

Figure 10:
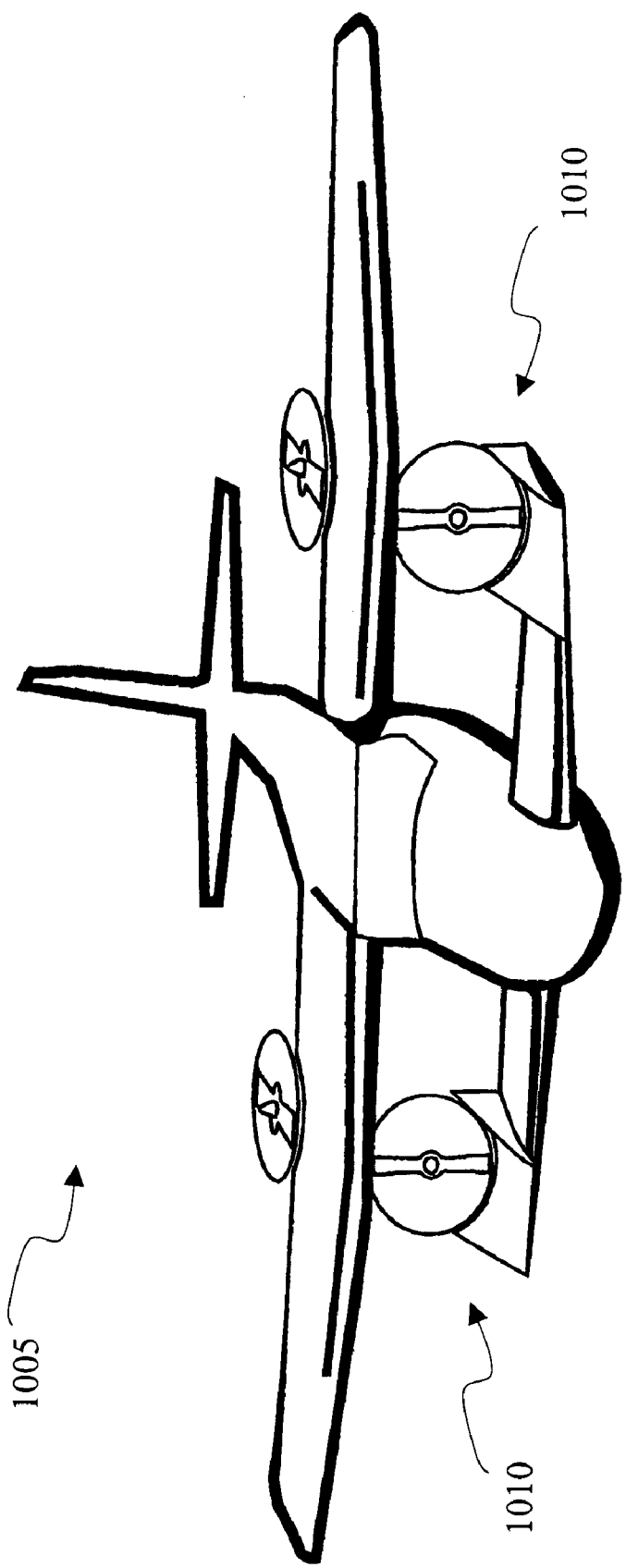
FIG. 10 illustrates an example of combinations of rotor and propeller embodiments of the present invention integrated into an aircraft.
Figure 11:
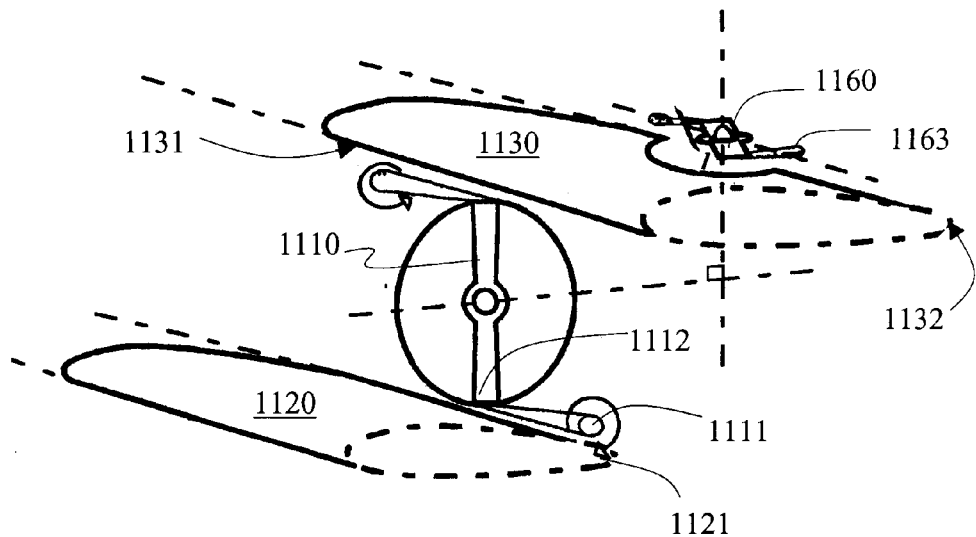
FIG. 11 is a perspective view illustrating both propeller and rotor embodiments of the present invention.
Figure 12:
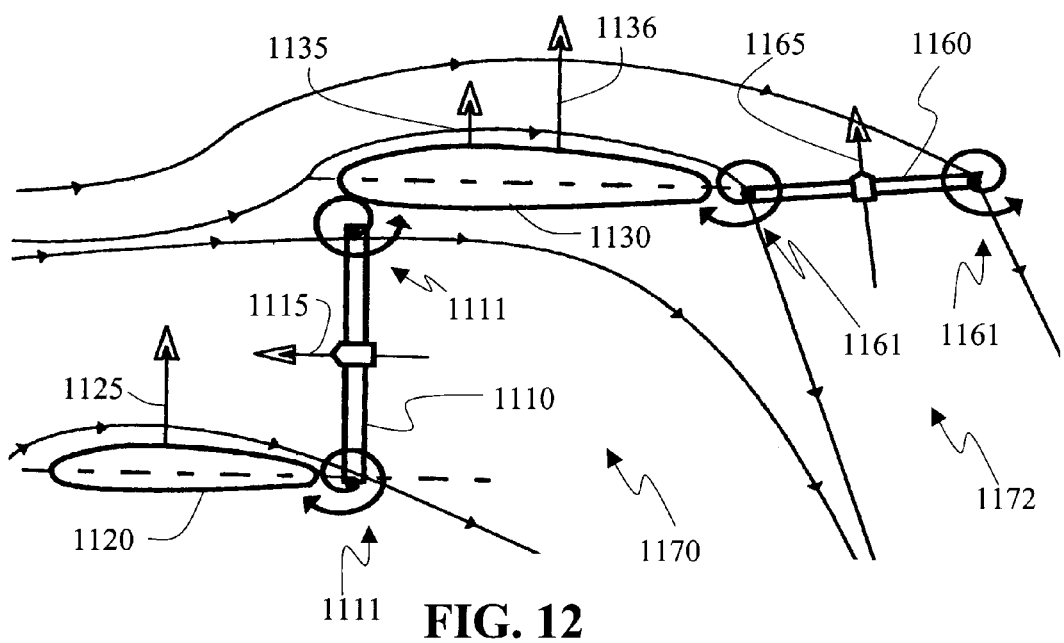
FIG. 12 is a side view illustrating both propeller and rotor embodiment and resulting induced lift and thrust vectors of the present invention.

Operating propellers similar to rotors produce "tip" trailing vortex flows as explained in the section below. FIG. 10 is an illustration of an example aircraft 1005 equipped with a wing-rotor-propeller system 1010. The example embodiment of the present invention, as configured in this illustration, is designed to maximize the contributions of the rotor and propeller vortex flows to induced aerodynamic wing lift and induced aerodynamic wing thrust. This configuration lends itself to an alternative embodiment that includes an air-blowing means such as a compressed gas generator in combination with starboard side and port side vents or jets located on the top side and on the bottom side of the wing containing the air-blowing device. FIG. 11 is an isometric view of the wing-rotor-propeller configuration of FIG. 10 and is also an illustration of the trailing edge flows. The propeller 1110 is interposed between a first win 1130 and a second wing 1120. The propeller 1110 being substantially perpendicular to the second wing 1120 and first wing 1130 and proximate to the trailing edge of the second wing 1121 and the leading edge of the first wing 1131 causes vortices 1111 from the propeller blade tips 1112 to induce lift on both lifting surfaces. The rotor 1160 placed at the trailing edge 1132 of the first wing 1130 produces blade tip vortices 1163 that in turn induce lift on the first wing 1130. FIG. 12 is a depiction of the induced aerodynamic force acting on the wings of the aircraft and the associated pressure fields. The propeller 1110 produces a forward thrust 1115 and its vortices 1111 induce a lift 1125 on the second wing 1120 and a lift 1135 on the first wing 1130. The rotor 1160 produces an upward thrust 1165 and its vortices 1161 produce lift 1136 on the first wing 1130. Two regions of high pressure are created: one aft of the propeller and below the first wing 1170 and one below the rotor 1172.

Figure 13:
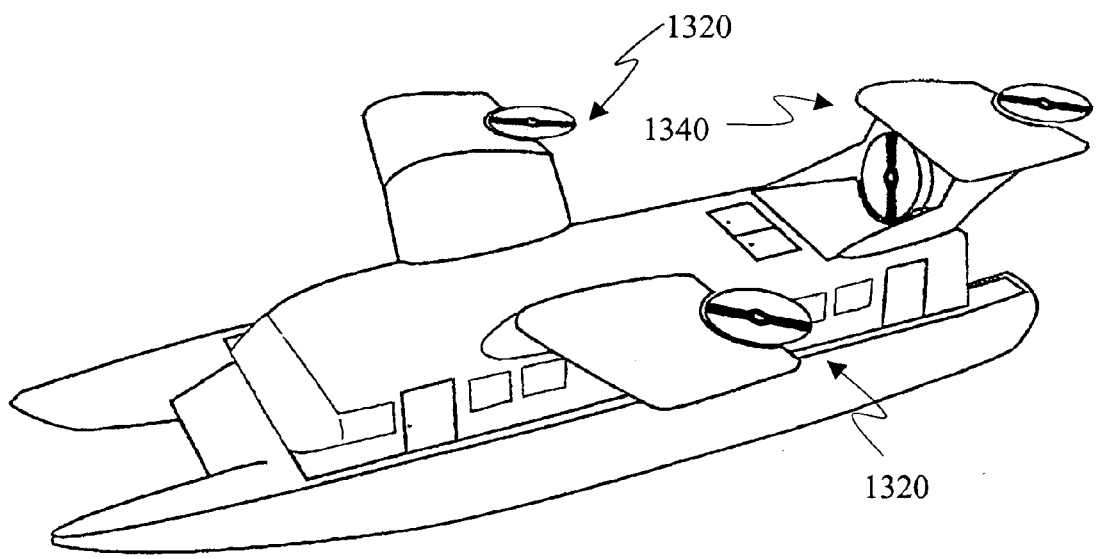
FIG. 13 is a perspective view of both rotor and propeller embodiments of the present invention applied to a water-craft.

Watercraft embodiments use wing-rotor assemblies and wing-rotor propeller assemblies separately and in combination preferably positioned at the mid-body and at the aft portions of watercraft. Where the assemblies are mid-body and substantially outboard, the assemblies are preferably used in pairs. Where the assemblies are at the aft portion, they are used in pairs or as a single assembly. A watercraft embodiment of the present invention is illustrated in FIG. 13. In this example, a wing-rotor configuration pair is used mid-body 1320 with an elevated aft section using a wing-rotor-propeller configuration 1340. In this example, the lifting surfaces have arcular cutouts leading rotors. Alternative embodiments of the watercraft have an aft section with a wing-rotor configuration without mid-body wing-rotor configurations while other embodiments include mid-body wing-rotor assembly pairs.

Aerodynamics of Wing-rotor and Wing-rotor-Propeller

The wing-rotor systems and also wing-rotor-propeller systems are synergistic combinations of a wing, rotor, and a propeller that have higher aerodynamic efficiencies in forward flight than either an isolated wing, e.g., a conventional aircraft, or an isolated rotor, e.g., a helicopter, or an isolated wing-propeller combination.

Two-dimensional Wing, Line Vortex Flow

Figure 14:
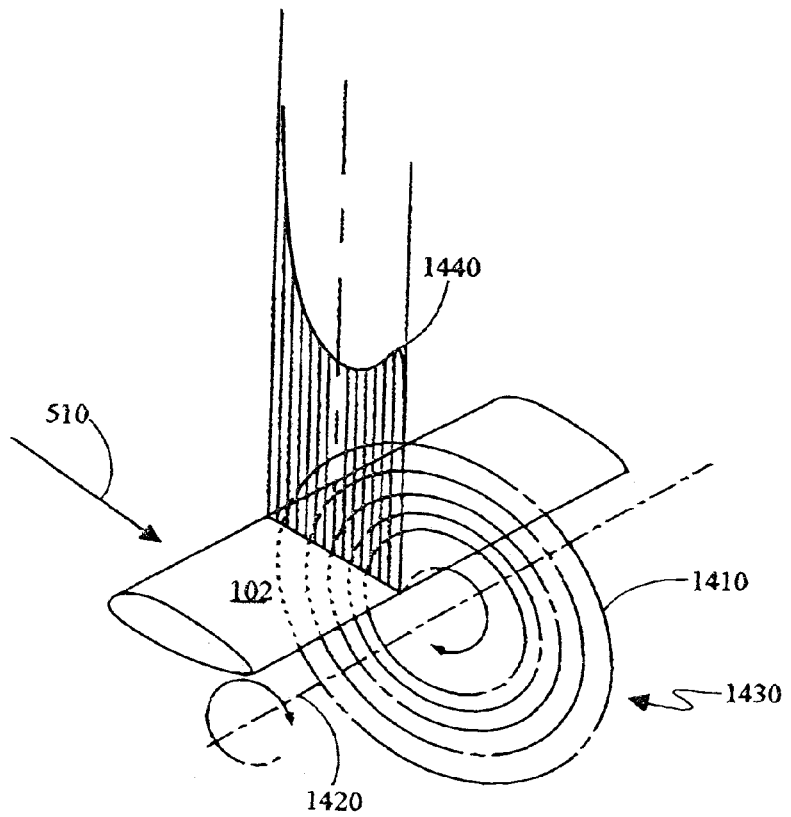
FIG. 14 is a perspective view of a diagram illustrating the lifting effect produced by rotor vortices.

A fluid vortex line is characterized by fluid rotating in a circular fashion 1410 in planes normal to the vortex line 1420, as illustrated in FIG. 14. The velocity and momentum of the rotating fluid is upwards ahead of the vortex line 1420 since the direction of the fluid is upwards. Behind the vortex line 1430, the momentum of the fluid is downwards. A thin flat surface (like a wing 102) inserted into the fluid a small distance ahead and in the same plane as the vortex line 1420 will receive the maximum upwardly-directed momentum of the rotating fluid. If the wing and vortex line are both moving at the same velocity, for example, a value of the magnitude of the velocity vector, $V_o$ 510, then the upwardly directed momentum of the rotating fluid will be communicated to fresh masses of air moving over the wing. Per unit of time, this momentum will cause a distribution of "lifting pressure" 1440 to act on the wing. The integration of this pressure distribution yields a lifting force, 710, acting on the wing as illustrated in FIG. 7.

Figure 15:
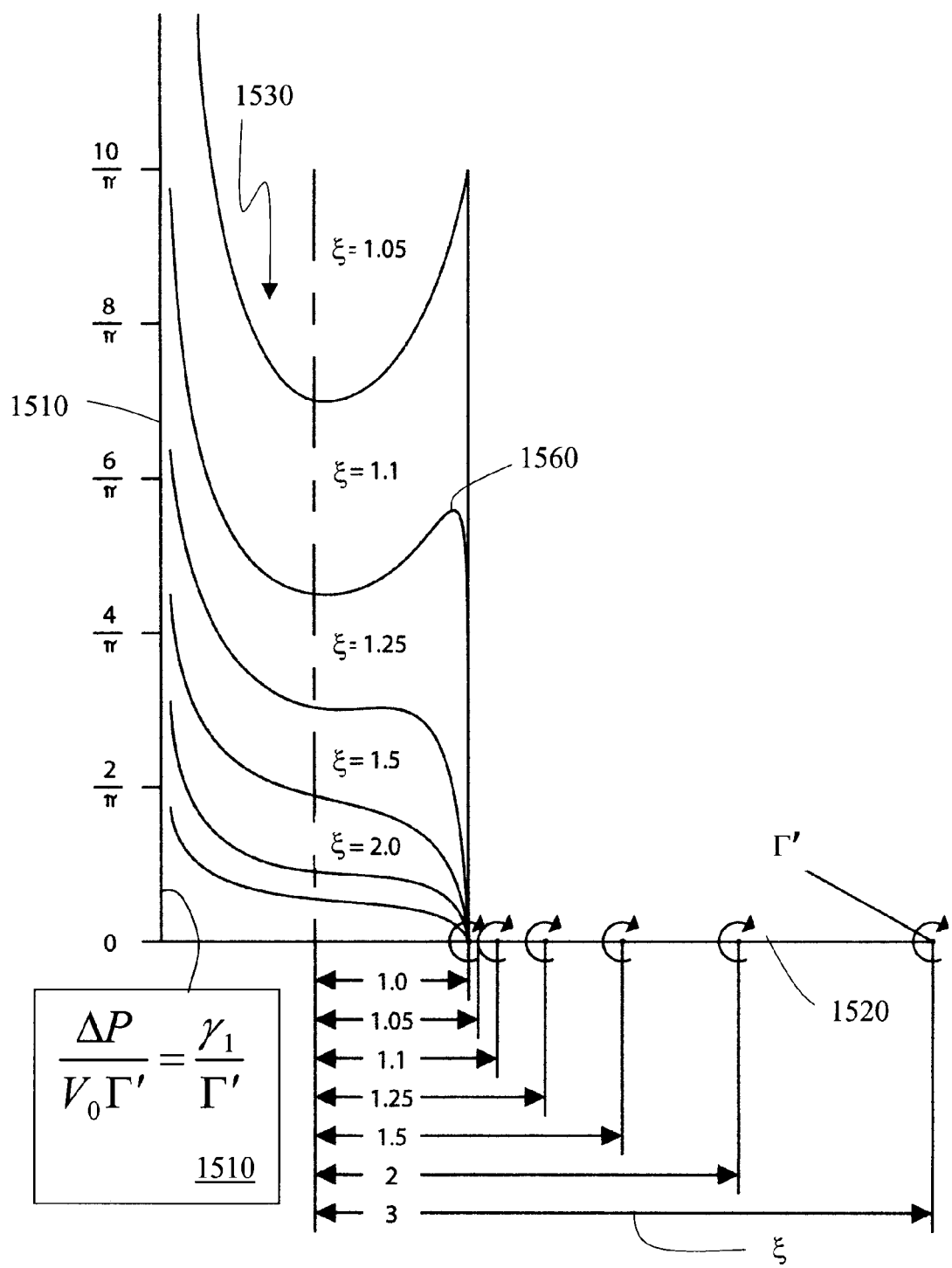
FIG. 15 is a diagram illustrating the magnitudes of lifting pressures on a wing relative to location of vortices.

FIG. 15 is an illustration of the distribution of lifting pressure, $\Delta P$, per unit of $V_o \Gamma'$ that is induced on the wing by the fluid action of an infinite line vortex for several chord-wise locations of the line vortex. Accordingly, the ordinate scale is $\Delta P/V_o \Gamma'$ 1510.

The effect of an element of vorticity, $\Gamma'$ 1520, at a point $\zeta$ on the pressure distribution of a two-dimensional airfoil has been calculated and presented in the FIG. 15. In the diagram, the symbol, $\zeta$, denotes the x-position of a wake vortex of strength $\Gamma'$ where $\zeta$ is measured from the mid-point of the airfoil and is positive in the aft direction.

It is seen from the diagram that a wake vortex located one-half of a chord length, or more, behind the wing trailing edge induces a pressure distribution that is similar to the well-known distribution produced by a small angle-of-attack, while a vortex located very close to the airfoil induces a much stronger pressure distribution over the chord, with a definite peak 1560 near the trailing edge, in the example where $\zeta$ has a value of 1.1.

In maximizing this effect in the several embodiments of the present invention, the vortex lines 166 are substantially parallel to a wing trailing edge 106 so as to induce large lifting pressures along the wing, provided the vortex circulation is in the same direction as the wing circulation with the vortex line located substantially in the plane of the wing or below the plane of the wing while proximate to the trailing edge of the wing. In the arcuate recesses herein described, the relationships disclosed provide for methods of augmenting thrust, reducing drag and enhancing the effective pre-stall angle-of-attack of airfoils by placing the axis of rotation of each rotor aft of what would otherwise be the trailing edge of a nominal airfoil, and more precisely locating the axis of rotation to achieve the desired scaled lifting pressure.

Rotor-propeller Flows

If one reviews in detail the flow pattern in the immediate area of the tips of a rotating blade, it becomes evident that flow conditions can be very different from those near the tip of an airfoil moving in translatory motion. In particular, the "tip effect" is far stronger for a rotating blade than for a wing moving in a translatory manner. Helical vortex lines of large strength (circulation) emanate from the tips of the rotating blades as illustrated in FIG. 4. These "strong" vortex lines are brought about by the relatively large amount of kinetic energy communicated to the fluid by the rotor or propeller when generating lift or thrust.

Some measure of the relative strengths of an isolated wing trailing vortex system compared to a rotor or propeller trailing vortex systems can be determined by calculating the circulation of each of these systems for a constant span loading condition. It should be recalled that circulation, Γ, is a numerical measure of the capability of a vortex to put into circulating motion around the vortex a mass of air at some velocity.

Continuing the description of the circulation, R represents the rotor or propeller radius in linear units of feet; C represent the wing chord in linear units of feet; $V_i$ represent the rotor or propeller inflow velocity, in linear velocity units of feet-per-second (fps); T represent rotor or propeller thrust, in force units of pounds ($lbs_f$); and $V_T$ represent the tangential velocity at rotor or propeller tip, in linear velocity units of fps. Equations for calculating $V_i$ and $V_T$ are:

$$V_i = \frac{1}{R}\sqrt{\frac{T}{2\Pi\rho}} \quad [1]$$

where ρ represents air density and $$V_T = \left(\frac{f2\pi}{60}\right)R \quad [2]$$

Where f is frequency units of revolutions-per-minute (rpm).

Using classical equations for calculating $\Gamma_a$ and $\Gamma_p$, we derive the following equation for the ratio of these circulations:

$$\frac{\Gamma_p}{\Gamma_a} = \left(\frac{R}{C}\right)\left(\frac{V_i}{V_T}\right)\left(\frac{V_i}{w_\alpha}\right); \quad [3]$$

Although equation [3] is based on simplified assumptions, numerical values of the ratio $\Gamma_p/\Gamma_a$ obtained from the equation are practical approximations to the actual ratios. This equation yields values of $\Gamma_p$ greater than $\Gamma_a$, for a wide range of compatible rotor and wing geometries, rotor or propeller revolutions per minute and flight velocities.

Additional Aerodynamic Features

For wing-rotor configurations identified herein the significant increases in wing lift and thrust induced on the wing by the trailing vortex flows of rotors represent a major improvement in the aerodynamic performance of lifting systems. Additional distinct and significant aerodynamic improvements include the airflow attachment along the upper surface of a wing and inducement of the vortex flap effect.

Figure 16A:
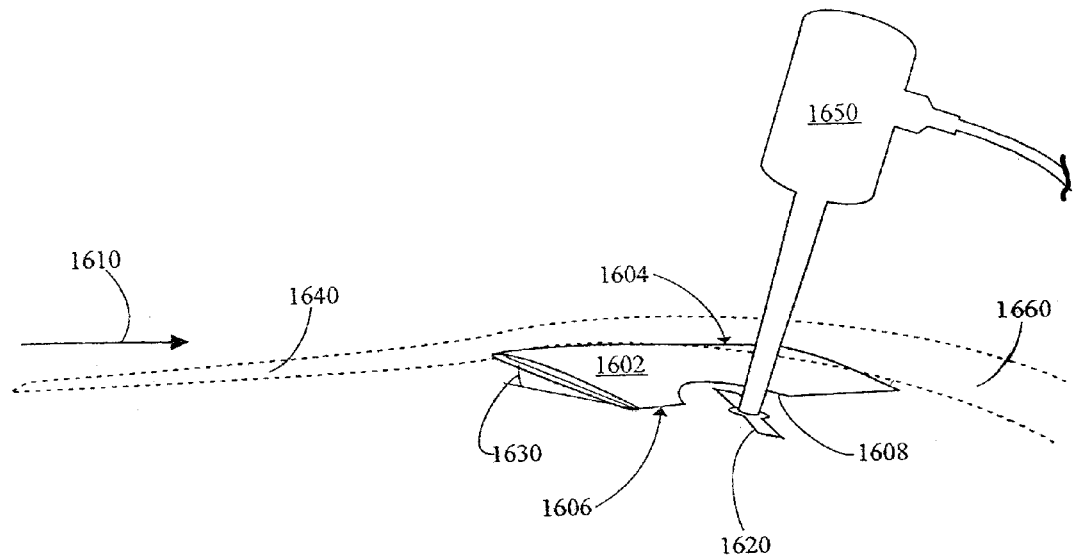
FIG. 16A illustrates smoke flow over a representative wing-rotor configuration mounted in a wind tunnel for rotor rpm of 0.
Figure 16B:
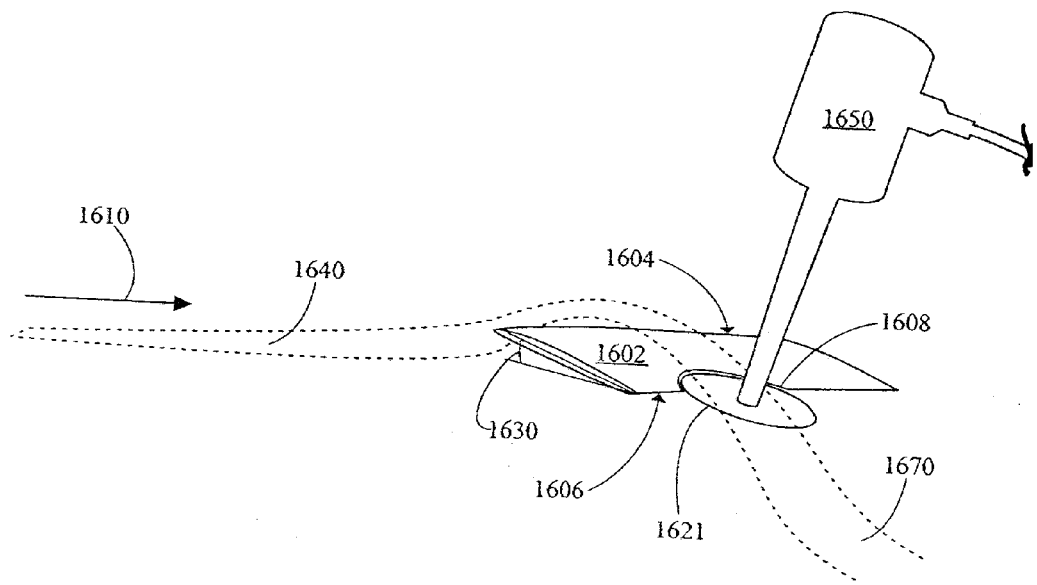
FIG. 16B illustrates smoke flow over a representative wing-rotor configuration mounted in a wind tunnel for rotor rpm of 7,500.

The airstream and boundary layer flow along the upper surface of the wing that is in front of the rotor will remain attached to the surface of the wing for a range of high angles-of-attack because of the wing surface favorable chord-wise pressure gradient, i.e., $$\frac{dp}{dx} < 0,$$

produced by the low pressure field of the rotor above the plane of the rotor. FIG. 16A and FIG. 16B present flow over a wind tunnel model of a wing/rotor configuration in a 45 fps, flow, 1610, at angle-of-attack of 18 degrees, 1630, and rotor rpm=0, 1620, and 7500 rpm, 1621. FIG. 16B, illustrates that for rpm of 0, 1620, the upper surface air flow 1660 is separated. For rotor rpm=7500, 1621, the upper surface flow 1670 is attached and descends through the rotor boundary.

The vortex flap is defined herein as the frontal portion of the vortex surface of the rotor slipstream that decelerates and deflects the oncoming flow along and below the lower surface of the wing from leading edge to trailing edge. This favorable aerodynamic effect increases the lift of the wing and also by inducing an "upwash" velocity flow along the wing chord as illustrated in FIG. 7, provides an aerodynamic thrust force to the wing.

Alterations and Modifications

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. An airfoil-rotor apparatus comprising:
    a first wing having a leading edge, a trailing edge and a plane of the first wing interposed between a top side and a bottom side of the first wing wherein, in the plane of the first wing, the first wing has at least one arcuate recess having a chord co-linear with the trailing edge of the first wing; and
    at least one rotor having a plurality blades, a center of planar rotation and an angle of planar rotation incline relative to the plane of the first wing wherein each of the plurality of blades has a pitch angle and a tip distal from the center of planar rotation and wherein the at least one rotor is positioned so that rotations of the plurality of blades about the center of planar rotation cause the rotor blade tips turning in an air flow to pass proximate to the at least one arcuate recess forward of the trailing edge of the first wing and wherein the center of planar rotation is aft of the chord co-linear with the trailing edge of the first wing.

2. The airfoil-rotor apparatus as claimed in claim 1 wherein the angle of planar rotation incline relative to the plane of the first wing is adjustable in a plane perpendicular to the plane of the first wing.

3. The airfoil-rotor apparatus as claimed in claim 1 wherein an angle is subtended by the at least one arcuate recess relative to a center or planar rotation of an associated at least one rotor and said angle is substantially less than 180 degrees.

4. The airfoil-rotor apparatus as claimed in claim 1 wherein at least one arcuate recess of the first wing has a vertical section having upper and lower boundaries and wherein rotations of the plurality of blades of the at least one rotor cause the rotor blade tips turning in air flow to pass within the upper and lower boundaries of the vertical section.

5. The airfoil-rotor apparatus as claimed in claim 4 wherein an adjustable angle of planar rotation incline relative to the plane of the first wing is constrained so that rotations of the plurality of blades of the at least one rotor cause the plurality of rotor blade tips turning in air flow to pass between the upper and lower boundaries of the vertical section.

6. The airfoil-rotor apparatus as claimed in claim 1 wherein the pitch of each rotor blade is adjustable.

7. The airfoil-rotor apparatus as claimed in claim 1 wherein the rotor further comprises a shaft wherein a motor linked to the shaft rotationally drives the rotor.

8. The airfoil-rotor apparatus as claimed in claim 1 wherein the motor driving the rotor shaft is disengages in the event of power failure.

9. The airfoil-rotor apparatus as claimed in claim 1 wherein the rotor tips have inverse tapers.

10. The airfoil-rotor apparatus as claimed in claim 9 wherein the rotor tips are swept.

11. The airfoil-rotor apparatus as claimed in claim 1 further comprising an air-blowing means substantially contained within the first wing, wherein the first wing has a top side vent proximate to the first wing and a bottom side vent proximate to the first wing leading edge wherein the air-blowing means blows air aft over the top side of the first wing and aft over the bottom side of the first wing.

12. The airfoil-rotor apparatus of claim 1 further comprising:
a second wing having a leading edge, a tailizg edge and a plane of the second wing interposed between a top side and a bottom side of the second wing;
a propeller having a plurality of blades, each of the plurality of blades having a tip, the propeller having a center of rotation and being substantially perpendicular with and interposing between the first wing and the second wing wherein each of the tips of the propeller, when rotating about a propeller center of rotation, pass in close proximately to the leading edge of the first wing and in close proximately to the trailing edge of the second wing.

13. The airfoil-rotor apparatus of claim 12 further comprising a propeller motor rotationally driving the propeller.

14. The airfoil-rotor apparatus of claim 12 further comprising mechanical linkage between the rotor drive shaft and the propeller motor.

15. An aircraft airfoil assembly comprising:
a first wing having a first starboard wing portion and a first port wing portion, the first wing having a leading edge, a trailing edge and a plane of the first wing interposed between a top side and a bottom side of the first wing, wherein, in the plane of the first wing the first wing has at least one starboard arcuate recess and at least one port arcuate recess each arcuate recess having a chord co-linear with the trailing edge of the first wing; and
at least one starboard rotor and at least one port rotor, each rotor having a plurality blades, a center of planar rotation and an angle of planar rotation incline relative to the plane of the first wing wherein each of the plurality of blades has a pitch angle and a tip distal from the center of planar rotation and wherein rotations of the plurality of blades of the at least one starboard rotor cause the starboard rotor blade tips turning in an air flow to pass proximate to the at least one starboard arcuate recess of the first wing and wherein rotations of the plurality of blades of the at least one port rotor cause the port rotor blade tips turning in the air flow to pass proximate to the at least one port arcuate recess of the first wing and wherein the center of planar rotation of the starboard rotor and the center of planar rotation of the port rotor are aft of the respective chord co-linear with the trailing edge of the first wing.

16. The aircraft airfoil assembly as claimed in claim 15 wherein for each rotor, each of the angles of planar rotation incline relative to the plane of the first wing are adjustable in a plane perpendicular to the plane of the first wing.

17. The airfoil-rotor assembly as claimed in claim 15 wherein for each arcuate recess an angle is subtended by each arcuate recess relative to a center of planar rotation of an associated rotor and said angle is substantially less than 180 degrees.

18. The aircraft airfoil assembly as claimed in claim 15 wherein the at least one starboard arcuate recess and the at least one starboard arcuate recess of the first wing each have a vertical section having upper and lower boundaries and wherein rotations of the plurality of blades of the at least one starboard rotor and of the at least one port rotor cause the rotor blade tips turning in air flow to pass within the upper and lower boundaries of each of the vertical sections.

19. The aircraft airfoil assembly as claimed in claim 18 wherein an adjustable angle of planar rotation incline relative to the plane of the first wing is constrained so that rotations of the plurality of blades of the at least one starboard rotor and of the plurality of blades of the at least one port rotor cause the plurality of rotor blade tips turning in air flow to pass between the upper and lower boundaries of each of the vertical sections.

20. The aircraft airfoil assembly as claimed in claim 15 further comprising:
a second wing having a leading edge, a trailing edge and a plane of the second wing interposed between a top side and a bottom side of the second wing;
at least one starboard propeller and at least one port propeller, each propeller having a plurality of blades, each of the plurality of blades having a tip, the at least one starboard propeller and the at least one port propeller each having a center of rotation and a plane of rotation, each plane of rotation being substantially perpendicular with and interposing between the first wing and the second wing wherein each of the tips of the starboard propeller, when rotating about at least one starboard propeller center of rotation, and each of the tips of the port propeller, when rotating about the at least one port propeller center of rotation, pass in close proximately to the leading edge of the first wing and in close proximately to the trailing edge of the second wing.

21. The aircraft airfoil assembly as claimed in claim 15 further comprising at least one starboard propeller motor rotationally driving the at least one starboard propeller and at least one port propeller motor rotationally driving the at least one port propeller.

22. The aircraft airfoil assembly as claimed in claim 15 further comprising mechanical linkage between the at least one starboard rotor drive shaft and at least one starboard propeller motor and mechanical linkage between the at least one port rotor drive shaft and at least one port propeller motor.

23. The aircraft airfoil assembly as claimed in claim 15 wherein the pitch of each propeller blade is adjustable.

24. The aircraft airfoil assembly as claimed in claim 15 further comprising a starboard air-blowing means and a port air-blowing means, each air-blowing means being substantially contained within the first wing, wherein the first wing has a starboard top side vent proximate to the first wing and a starboard bottom side vent proximate to the first wing leading edge and a port top side vent proximate to the first wing and a port bottom side vent proximate to the first wing leading edge wherein the starboard air-blowing means and port air-blowing means each blow air aft over the top side of the first wing and aft over the bottom side of the first wing.

25. A watercraft airfoil assembly comprising:
   a first wing having a leading edge, a trailing edge and a plane of the first wing interposed between a top side and a bottom side of the first wing wherein, in the plane of the first wing, the first wing has at least one arcuate recess having a chord co-linear with the trailing edge of the first wing; and
   at least one rotor having a plurality blades, a center of planar rotation and an angle of planar rotation incline relative to the plane of the first wing wherein each of the plurality of blades has a pitch angle and a tip distal from the center of planar rotation and wherein rotations of the plurality of blades of the at least one rotor cause the rotor blade tips turning in an air flow to pass proximate to the at least one arcuate recess of the first wing and wherein the center of planar rotation is aft of the chord co-linear with the trailing edge of the first wing.

26. The watercraft airfoil assembly as claimed in claim 25 wherein the angle of planar rotation incline relative to the plane of the first wing is adjustable in a plane perpendicular to the plane of the first wing.

27. The watercraft airfoil assembly as claimed in claim 25 wherein for each arcuate recess an angle is subtended by each arcuate recess relative to a center of planar rotation of an associated rotor and said angle is substantially less than 180 degrees.

28. The watercraft airfoil assembly as claimed in claim 25 wherein at least one arcuate recess of the first wing has a vertical section having upper and lower boundaries and wherein rotations of the plurality of blades of the at least one rotor cause the rotor blade tips turning in air flow to pass within the upper and lower boundaries of the vertical section.

29. The watercraft airfoil assembly as claimed in claim 28 wherein an adjustable angle of planar rotation incline relative to the plane of the first wing is constrained so that rotations of the plurality of blades of the at least one rotor cause the plurality of rotor blade tips turning in air flow to pass between the upper and lower boundaries of the vertical section.

30. The watercraft airfoil assembly as claimed in claim 25 wherein the pitch of each rotor blade is adjustable.

31. The watercraft airfoil assembly as claimed in claim 25 wherein the rotor further comprises a shaft wherein a motor linked to the shaft rotationally drives the rotor.

32. The watercraft airfoil assembly as claimed in claim 25 wherein the motor driving the rotor shaft disengages in the event of power failure.

33. The watercraft airfoil assembly as claimed in claim 25 wherein the rotor tips have inverse tapers.

34. The watercraft airfoil assembly as claimed in claim 25 wherein the rotor tips are swept.

35. The watercraft airfoil assembly as claimed in claim 25 wherein the watercraft airfoil assembly is mounted on the aft portion of a watercraft.

36. The watercraft airfoil assembly as claimed in claim 25 further comprising an air-blowing means substantially contained within the first wing, wherein the first wing has a top side vent proximate to the first wing and a bottom side vent proximate to the first wing leading edge wherein the air-blowing means blows air aft over the top side of the first wing and aft over the bottom side of the first wing.

37. The watercraft airfoil assembly as claimed in claim 25 further comprising:
   a second wing having a leading edge, a trailing edge and a plane of the second wing interposed between a top side and a bottom side of the second wing, wherein the bottom side of the second wing proximate to the leading edge is substantially conformal to the aft topside of a watercraft;
   at least one propeller, each propeller having a plurality of blades, each of the plurality of blades having a tip, the at least one propeller having a center of rotation and a plane of rotation, the plane of rotation being substantially perpendicular with and interposing between the first wing and the second wing wherein each of the tips of each propeller, when rotating about each respective propeller center of rotation, pass in close proximately to the leading edge of the first wing and in close proximately to the trailing edge of the second wing.

38. The watercraft airfoil assembly as claimed in claim 37 further comprising at least one propeller motor rotationally driving the at least one propeller.

39. The watercraft airfoil assembly as claimed in claim 38 further comprising mechanical linkage between the at least one rotor drive shaft and at least one propeller motor.

40. The watercraft airfoil assembly as claimed in claim 37 wherein the pitch of each propeller blade is adjustable.

41. A watercraft airfoil assembly comprising:
   a first wing having a first starboard wing portion and a first port wing portion, the first wing portion having a leading edge, a trailing edge and a plane of the first wing interposed between a top side and a bottom side of the first wing wherein, in the plane of the first wing, the first wing has at least one starboard arcuate recess and at least one port arcuate recess, each arcuate recess having a chord co-linear with the trailing edge of the first wing; and
   at least one starboard rotor and at least one port rotor, each rotor having a plurality blades, a center of planar rotation and an angle of planar rotation incline relative to the plane of the first wing wherein each of the plurality of blades has a pitch angle and a tip distal from the center of planar rotation and wherein rotations of the plurality of blades of the at least one starboard rotor cause the starboard rotor blade tips turning in an air flow to pass proximate to the at least one starboard arcuate recess of the first wing and the at least one port arcuate recess of the first wing and wherein rotations of the plurality of blades of the at least one port rotor cause the port rotor blade tips turning in the air flow to pass proximate to the at least one port arcuate recess of the first wing and wherein the center of planar rotation is aft of the respective chord co-linear with the trailing edge of the first wing.

42. The watercraft airfoil assembly as claimed in claim 41 wherein for each rotor, each of the angles of planar rotation incline relative to the plane of the first wing are adjustable in a plane perpendicular to the plane of the first wing.

43. The watercraft airfoil assembly as claimed in claim 41 wherein for each arcuate recess an angle is subtended by each arcuate recess relative to a center of planar rotation of an associated rotor and said angle is substantially less than 180 degrees.

44. The watercraft airfoil assembly as claimed in claim 41 wherein the at least one arcuate recess of the starboard portion of the first wing and the at least one arcuate recess of the port portion of the first wing each have a vertical section having upper and lower boundaries and wherein rotations of the plurality of blades of the at least one rotor of the starboard portion of the first wing cause the rotor blade tips turning in air flow to pass within the upper and lower boundaries of each vertical section of the starboard portion of the first wing and rotations of the plurality of blades of the at least one rotor of the port portion of the first wing cause the rotor blade tips turning in air flow to pass within the upper and lower boundaries of each vertical section of the starboard portion of the first wing.

45. The watercraft airfoil assembly as claimed in claim 44 wherein adjustable angles of planar rotation incline for each of the rotors relative to the plane of the first wing are constrained so that rotations of the plurality of blades of the at least one starboard rotor and of the at least one port rotor cause the plurality of starboard rotor blade tips turning in air flow and the plurality of port rotor blade tips turning in air flow to pass between the upper and lower boundaries of each respective vertical section.

46. The watercraft airfoil assembly as claimed in claim 41 wherein the pitch of each rotor blade is adjustable.

47. The watercraft airfoil assembly as claimed in claim 41 wherein each rotor furthers comprises a shaft and wherein at least one motor is linked to each shaft and thereby rotationally drives each rotor.

48. The watercraft airfoil assembly as claimed in claim 41 wherein the at last one motor driving each rotor shaft disengages in the event of motor power failure.

49. The watercraft airfoil assembly as claimed in claim 41 wherein the rotor tips have inverse tapers.

50. The watercraft airfoil assembly as claimed in claim 49 wherein the rotor tips are swept.

51. The watercraft airfoil assembly as claimed in claim 41 further comprising a starboard air-blowing means and a port air-blowing means, each air-blowing means being substantially contained within the first wing, wherein the first wing has a starboard top side vent proximate to the first wing and a starboard bottom side vent proximate to the first wing leading edge and a port top side vent proximate to the first wing and a port bottom side vent proximate to the first wing leading edge wherein the starboard air-blowing means and port air-blowing means each blow air aft over the top side of the first wing and aft over the bottom side of the first wing.

52. The watercraft airfoil assembly as claimed in claim 41 further comprising:
a second wing having a leading edge in an airstream, a trailing edge and a plane of the second wing interposed between a top side and a bottom side of the second wing;
at least one aft rotor having a plurality blades, a center of planar rotation and an angle of planar rotation incline relative to the plane of the second wing wherein each of the plurality of blades has a pitch angle and a tip distal from the center of planar rotation and wherein each aft rotor is positioned so that rotations of the plurality of blades about the center of planar rotation cause the aft rotor blade tips turning in air flow to pass proximate to the trailing edge of the second wing and wherein the center of planar rotation is aft of the trailing edge of the second wing; and
a third wing having a leading edge, a trailing edge and a plane of the third wing interposed between a top side and a bottom side of the third wing, wherein the bottom side of the third wing proximate to the leading edge is substantially conformal to the aft topside of a watercraft;
at least one propeller, each propeller having a plurality of blades, each of the plurality of blades having a tip, the at least one propeller having a center of rotation and a plane of rotation, the plane of rotation being substantially perpendicular with and interposing between the second wing and the third wing wherein each of the tips of each propeller, when rotating about each respective propeller center of rotation, pass in close proximately to the leading edge of the second wing and in close proximately to the trailing edge of the third wing.

53. The watercraft airfoil assembly as claimed in claim 52 wherein the angle of planar rotation incline relative to the plane of the second wing is adjustable in a plane perpendicular to the plane of the second wing.

54. The watercraft airfoil assembly as claimed in claim 52 further comprising in the plane of the second wing at least one arcuate recess having a chord co-linear with the trailing edge of the second wing wherein rotations of the plurality of blades of the at least one aft rotor cause the aft rotor blade tips turning in air flow to pass proximate to the at least one arcuate recess of the second wing.

55. The watercraft airfoil assembly as claimed in claim 54 wherein at least one arcuate recess of the second wing has a vertical section having upper and lower boundaries and wherein rotations of the plurality of blades of the at least one aft rotor cause the aft rotor blade tips turning in air flow to pass within the upper and lower boundaries of the vertical section.

56. The watercraft airfoil assembly as claimed in claim 55 wherein an adjustable angle of planar rotation incline relative to the plane of the second wing is constrained so that rotations of the plurality of blades of the at least one aft rotor cause the plurality of rotor blade tips turning in air flow to pass between the upper and lower boundaries of the vertical section.

57. The watercraft airfoil assembly as claimed in claim 52 wherein the pitch of each aft rotor blade is adjustable.

58. The watercraft airfoil assembly as claimed in claim 52 wherein the aft rotor further comprises a shaft wherein a motor linked to the shaft rotationally drives the aft rotor.

59. The watercraft airfoil assembly as claimed in claim 52 wherein the motor driving the aft rotor shaft disengages in the event of power failure.

60. The watercraft airfoil assembly as claimed in claim 52 wherein the aft rotor tips have inverse tapers.

61. The watercraft airfoil assembly as claimed in claim 60 wherein the aft rotor tips are swept.

62. The watercraft airfoil assembly as claimed in claim 52 further comprising an air-blowing means substantially contained within the second wing, wherein the second wing has a top side vent proximate to the second wing leading edge and a bottom side vent proximate to the second wing leading edge wherein the air-blowing means blows air aft over the top side of the second wing and aft over the bottom side of the second wing.

63. The watercraft airfoil assembly as claimed in claim 52 further comprising a propeller motor rotationally driving the propeller.

64. The watercraft airfoil assembly as claimed in claim 52 further comprising the rotor drive shaft linked to the propeller motor.

65. A method of augmenting lift and reducing drag of an airfoil, the method comprising the steps of:

providing an airfoil having a leading edge, in ea airstrip, a trailing edge and a plane of the airfoil interposed between a top side and a bottom side of the airfoil wherein, in the plane of the airfoil, the first wine has at least one arcuate recess having a chord co-linear wit the trailing edge of the airfoil and at least one rotor having a plurality blades, a center of planar rotation and an angle of planar rotation incline relative to the plane of the airfoil wherein each of the plurality of blades has a pitch angle and a tip distal from the center of planar rotation; and positioning the at least one rotor so that the center of planar rotation is aft of the chord co-linear with the principal trailing edge and wherein rotations of the plurality of blades about the center of planar rotation cause the rotor blade tips turning in air flow to pass proximate to the trailing edge of the first wing and wherein the center of planar rotation is aft of the trailing edge of the first wing;

wherein at least one arcuate recess of the airfoil has a vertical section having upper and lower boundaries and wherein rotations of the plurality of blades of the at least one rotor cause the rotor blade tips turning in an airflow to pass within the upper and lower boundaries of the vertical section.

66. The method of augmenting lift and reducing drag of an airfoil as claimed in claim 65 wherein an adjustable angle of planar rotation incline relative to the plane of the airfoil is constrained so that rotations of the plurality of blades of the at least one rotor cause the plurality of rotor blade tips turning in air flow to pass between the upper and lower boundaries of the vertical section.

67. A method of increasing angle-of-attack of an airfoil without stalling, the method comprising the steps of:

providing an airfoil having a leading edge it a trailing edge and a plane of the airfoil interposed between a top side and a bottom side of the airfoil wherein, in the plane of the airfoil, the first wing has at least one arcuate recess having a chord co-linear with the trailing edge of the airfoil and at least one rotor having a plurality blades, a center of planar rotation and an angle of planar rotation incline relative to the plane of the airfoil wherein each of the plurality of blades has a pitch angle and a tip distal from the center of planar rotation; and positioning the at least one rotor so that rotations of the plurality of blades about the center of planar rotation cause the rotor blade tips turning in an air flow to pass proximate to the trailing edge of the first wing and wherein the center of planar rotation is aft of the chord co-linear with the trailing edge of the first wing;

wherein at least one arcuate recess of the airfoil has a vertical section having upper and lower boundaries and wherein rotations of the plurality of blades of the at least one rotor cause the rotor blade tips turning in airflow to pass within the upper and lower boundaries of the vertical section; and wherein the at least one rotor is rotated thereby drawing a portion of the airstream so as to pass substantially over the top side of the airfoil.

68. The method of increasing angle-of-attack of an airfoil without stalling as claimed in claim 67 wherein an adjustable angle of planar rotation incline relative to the plane of the airfoil is constrained so that rotations of the plurality of blades of the at least one rotor cause the plurality of rotor blade tips turning in air flow to pass between the upper and lower boundaries of the vertical section.

\* \* \* \* \*